No. 880,295. PATENTED FEB. 25, 1908.
J. F. S. GOBLE.
GATE.
APPLICATION FILED JAN. 12, 1907. RENEWED AUG. 30, 1907.
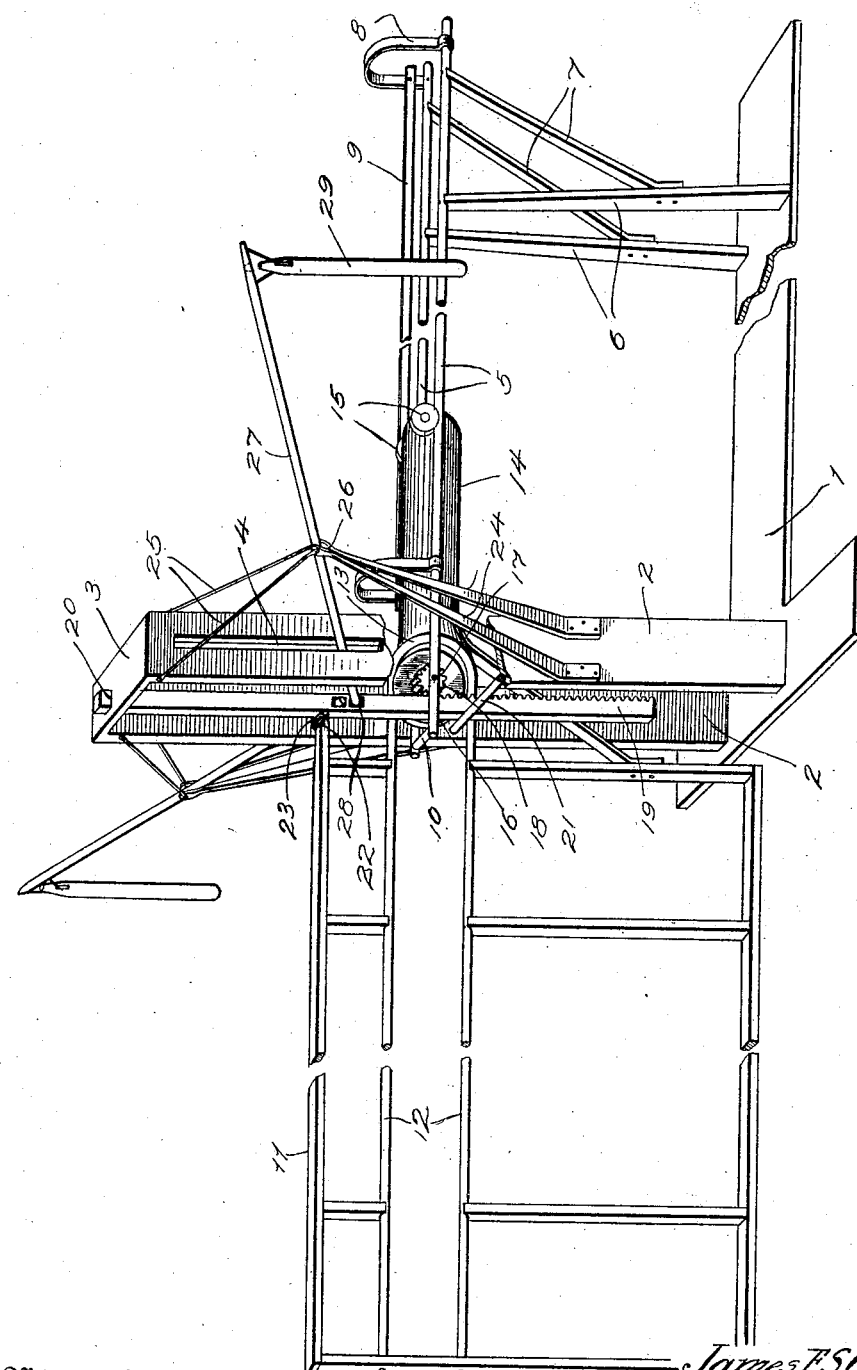
Witnesses
Inventor
James F. S. Goble
By Victor J. Evans
Attorney

UNITED STATES PATENT OFFICE.

JAMES F. S. GOBLE, OF NEW ALBIN, IOWA.

GATE.

No. 880,295.      Specification of Letters Patent.      Patented Feb. 25, 1908.

Application filed January 12, 1907. Serial No. 352,004. Renewed August 30, 1907. Serial No. 390,827.

*To all whom it may concern:*

Be it known that I, JAMES F. S. GOBLE, a citizen of the United States, residing at New Albin, in the county of Allamakee and State of Iowa, have invented new and useful Improvements in Gates, of which the following is a specification.

This invention relates to gates, being especially directed to the manner of mounting and operating the gate, and has for its objects to provide a comparatively simple, inexpensive device of this character wherein the gate will be properly sustained for free movement to and fro across the roadway, one wherein the gate will move smoothly and evenly in operation, and one in which the gate operating mechanism may be conveniently operated from points at either side of and remote from the gateway and this by a person mounted upon horseback or in a vehicle.

With these and other objects in view, the invention comprises the novel features of construction and combination of parts more fully hereinafter described.

In the accompanying drawing: there is shown a perspective view of a gate mounted and operated in accordance with the invention.

Referring to the drawings, it will be seen that the gate supporting framework comprises a base 1 from the forward end of which there arises a pair of spaced, vertical posts or standards 2 connected at their upper ends by means of a cross piece 3 and provided between their ends with longitudinal guide openings or slots 4, there being extended rearwardly from the posts a pair of relatively spaced, horizontal tracks or rails 5 sustained adjacent their rear ends on vertical supporting bars 6 attached at their lower ends to the base 1 and carrying diagonal braces 7 extended from the supports to a point near the ends of the rails, which are connected at points adjacent their front and rear ends by means of vertically disposed, substantially U-shaped yokes 8 designed to hold the rails in spaced relation, while extended between and terminally attached to the yokes is a guard rail 9 arranged in a plane somewhat above that of the track rails which are further connected at their forward ends by a transverse end bar 10.

Sustained above the framework and for endwise movement to and fro across the roadway is a gate 11 which has a pair of vertically spaced guide rails 12 extended longitudinally and integrally joined at their rear ends by a curved end portion 13, as shown, to which is attached a rearwardly projecting weight 14 adapted to counterbalance the weight of the gate and to the rear end of the weight there is journaled a pair of grooved guide pulleys or wheels 15 which travel respectively on the rails 5, there being mounted between the forward ends of the rails 5 a rotary guiding and actuating wheel 16 carried on a horizontal pintle or shaft 17 fixed for movement with a pinion 18 adapted to be acted upon by the toothed portion of a vertically movable operating rack member or bar 19 adapted to move freely through a bearing opening 20 formed in the upper connecting piece 3 and adapted to travel between its ends in contact with a horizontal bearing rod 21 extending transversely between the standards 2 in position to bear on the forward edge of the bar 19 for holding the toothed portion thereof in mesh with the pinion 18, while fixed to the operating bar 19 is a latch member 22 disposed for engagement with a notch or keeper 23 in the extreme upper gate rail to lock the gate in closed position.

Fixed upon each of the standards 2 is a pair of upwardly and outwardly inclined bearing members or arms 24 sustained at their upper ends by bracing rods 25 and terminating at their upper ends in a bearing 26, while fulcrumed between its ends in said bearing is an operating lever 27 engaged at its inner end as at 28 with the operating bar 19 and provided at its outer end with a depending end piece 29, it being noted that the levers 27, which are arranged for movement in the guide openings 4, project outwardly from the standards in a plane at right angles to the gate and longitudinally of the roadway.

In practice, the gate normally stands in closed position as shown, under which conditions the latch member 22 will engage the keeper 23 for locking the gate in closed position and the curved end portion 13 of the guide rails 12 will conform to and lie substantially in contact with the actuating wheel 16. Under these conditions and in order to open the gate one of the hand pieces 29 is grasped and drawn downward, thereby rocking the companion lever 27 on its fulcrum for moving the operating bar 19 upwardly, whereby the toothed portion of the bar will act upon the pinion 18 for rotating the wheel 16 in the direction indicated by the arrow, thereby causing the wheel through frictional engagement with the upper guide rail 12 to carry the gate rearwardly to open position. During rearward movement of the gate the pulleys 15 travel on the rails 5 for guiding the gate in its movements, while the guard rail 9 bears upon one of the pulleys to prevent them from jumping the tracks, it being noted that at the beginning of the movement of bar 19 the latch member will be carried out of engagement with the keeper and further that the closing movement of the gate is effected by a reverse movement of one of the levers 27. It is apparent that in operation the gate will move freely and smoothly and that the weight 14 will counterbalance the weight of the gate for preventing sagging of the forward end of the latter.

Having thus described my invention, what I claim is:

1. In a device of the class described, a frame including a slotted standard and a pair of rearwardly extending track rails, a longitudinal movable gate having a pair of vertically spaced longitudinally extending guide rails, a weight secured to and rearwardly projecting from the guide rails, rollers journaled on the weight for movement on the track rails, a guard rail, an operating wheel journaled on the track rails between the guide rails, a pinion fixed on the operating wheel, a toothed operating bar mounted on the frame for engagement with the pinion, a bracket mounted upon the standard, and an operating lever pivotally mounted upon the bracket for movement in the slot of the standard, said lever having engagement with the operating bar.

2. In a device of the class described, a standard, an operating wheel journaled thereon, a gate mounted upon the operating wheel, a track rail, a counter-balancing weight secured to the gate, a roller carried by the weight for movement on the track rail, and means by which rotary motion can be imparted to the operating wheel to open and close the gate.

3. In a device of the class described, a standard, an operating wheel journaled thereon, a gate provided with a guide rail and mounted on the operating wheel through the medium thereof, a track rail, a counter-balancing weight secured to the guide rail, a roller carried by the weight for movement on the track rail, and means by which rotary motion can be imparted to the operating wheel to open and close the gate.

4. In a device of the class described, a standard, an operating wheel journaled thereon, a gate provided with a pair of vertically spaced guide rails and mounted upon the operating wheel through the medium thereof, a track rail, a counter-balancing weight secured to and projecting from the guide rails, a roller carried by the weight for movement on the track rail, and means by which rotary motion can be imparted to the operating wheel to open and close the gate.

In testimony whereof, I affix my signature in presence of two witnesses.

JAMES F. S. GOBLE.

Witnesses:
W. O. BOCK,
OSCAR C. TANTT.